US010782270B2

(12) United States Patent
Theuss et al.

(10) Patent No.: US 10,782,270 B2
(45) Date of Patent: Sep. 22, 2020

(54) PHOTOACOUSTIC GAS SENSOR PACKAGE

(71) Applicant: Infineon Technologies AG, Neubiberg (DE)

(72) Inventors: Horst Theuss, Wenzenbach (DE); Rainer Markus Schaller, Saal (DE); Thomas Mueller, Lappersdorf (DE)

(73) Assignee: Infineon Technologies AG, Neubiberg (DE)

( * ) Notice: Subject to any disclaimer, the term of this patent is extended or adjusted under 35 U.S.C. 154(b) by 254 days.

(21) Appl. No.: 16/036,484

(22) Filed: Jul. 16, 2018

(65) Prior Publication Data

US 2020/0018731 A1 Jan. 16, 2020

(51) Int. Cl.
*G01J 5/02* (2006.01)
*G01N 29/24* (2006.01)
*G01N 21/17* (2006.01)
*G01N 29/30* (2006.01)
*G01N 29/032* (2006.01)

(52) U.S. Cl.
CPC ..... *G01N 29/2425* (2013.01); *G01N 21/1702* (2013.01); *G01N 29/032* (2013.01); *G01N 29/30* (2013.01)

(58) Field of Classification Search
CPC ............... G01N 29/2425; G01N 29/30; G01N 21/1702; G01N 2291/021; G01N 2021/1704; G01N 29/032
See application file for complete search history.

(56) References Cited

U.S. PATENT DOCUMENTS

| | | | |
|---|---|---|---|
| 6,344,647 B1* | 2/2002 | Jourdain | G01N 21/1702 250/339.07 |
| 9,513,261 B2 | 12/2016 | Dehe et al. | |
| 9,958,419 B2* | 5/2018 | Irisawa | A61B 5/0095 |

(Continued)

FOREIGN PATENT DOCUMENTS

DE 102015106373 A1 10/2016

OTHER PUBLICATIONS

Ann Garrison Darrin et al., "MEMS Packaging Materials" https://link.springer.com/chapter/10.1007/978-0-387-47318-5_12, Jan. 7, 2011, 12 pages.

(Continued)

*Primary Examiner* — Kiho Kim
(74) *Attorney, Agent, or Firm* — Harrity & Harrity, LLP (57) ABSTRACT

A photoacoustic sensor device may include a housing and first and second ceramic cavity packages disposed in the housing. The first ceramic cavity package may include a first sidewall having a first set of electrical contact elements, a first cavity structure, and a light source electrically coupled to the first set of electrical contact elements. The second ceramic cavity package may include a second sidewall having a second set of electrical contact elements, a second cavity structure, and a photoacoustic detector electrically coupled to the second set of electrical contact elements. The first and second ceramic cavity packages may be arranged such that the light source and the photoacoustic detector face one another, and oriented such that the first and second sets of electrical contact elements align with electrical contact points of a PCB when the photoacoustic sensor device is positioned over the PCB for coupling to the PCB.

20 Claims, 11 Drawing Sheets

(56) References Cited

U.S. PATENT DOCUMENTS

| | | | |
|---|---|---|---|
| 2013/0111975 A1* | 5/2013 | Gautieri | G01N 21/1702 73/24.02 |
| 2016/0313288 A1 | 10/2016 | Theuss et al. | |
| 2016/0320361 A1* | 11/2016 | Johansen | G01N 33/0013 |
| 2016/0356700 A1* | 12/2016 | Rouxel | G01N 21/1702 |
| 2017/0074834 A1 | 3/2017 | Dehe et al. | |
| 2017/0212036 A1 | 7/2017 | Mueller et al. | |

OTHER PUBLICATIONS

Springer Link, https://media.springernature.com/lw785/springer-static/image/chp%3A10.1007%2F978-0-387-47318-5_12/MediaObjects/978-0-387-47318-5_12_Fig1_HTML.gif, retrieved Jun. 8, 2018, 1 page.

* cited by examiner

PHOTOACOUSTIC GAS SENSOR PACKAGE

BACKGROUND

A photoacoustic gas sensor detects a presence, and/or a concentration, of a target gas, such as carbon dioxide ($CO_2$) and other types of gases, using a light sensor (e.g., an infrared (IR) emitter) and a photoacoustic detector (e.g., a microelectromechanical system (MEMS)-based microphone).

SUMMARY

According to some possible implementations, a photoacoustic sensor device may include a housing and a first ceramic cavity package disposed in the housing. The first ceramic cavity package may include a first sidewall having a first set of electrical contact elements, a first cavity structure, and a light source mounted to the first cavity structure and electrically coupled to the first set of electrical contact elements. The photoacoustic sensor device may include a second ceramic cavity package disposed in the housing. The second ceramic cavity package may include a second sidewall having a second set of electrical contact elements, a second cavity structure, and a photoacoustic detector mounted to the second cavity structure and electrically coupled to the second set of electrical contact elements. The first ceramic cavity package and the second ceramic cavity package may be arranged such that the light source and the photoacoustic detector face one another, and may be oriented such that the first set of electrical contact elements and the second set of electrical contact elements align with corresponding electrical contact points of a printed circuit board (PCB) when the photoacoustic sensor device is positioned over the PCB for coupling to the PCB.

According to some possible implementations, a photoacoustic gas sensor device may include a housing and a first ceramic cavity package disposed in the housing. The first ceramic cavity package may include a first sidewall having a first set of electrical contact elements, a first cavity structure, and a first semiconductor die coupled to the first cavity structure. The first semiconductor die may include an infrared (IR) emitter. The IR emitter may be electrically coupled to the first set of electrical contact elements. The photoacoustic gas sensor device may include a second ceramic cavity package disposed in the housing. The second ceramic cavity package may include a second sidewall having a second set of electrical contact elements, a second cavity structure, and a second semiconductor die coupled to the second cavity structure. The second semiconductor die may include a photoacoustic detector. The photoacoustic detector may be electrically coupled to the second set of electrical contact elements. The first ceramic cavity package and the second ceramic cavity package may be arranged such that the IR emitter and the photoacoustic detector face one another, and oriented such that the first set of electrical contact elements and the second set of electrical contact elements align with corresponding electrical contact points of a substrate when the photoacoustic gas sensor device is positioned over the substrate for coupling to the substrate.

According to some possible implementations, a method may include coupling a first semiconductor die to a cavity of a first ceramic cavity package. The first semiconductor die may include a light source. The method may include electrically bonding electrical leads, associated with the light source, to a first set of electrical contact elements disposed in a sidewall of the first ceramic cavity package. The method may include coupling a second semiconductor die to a cavity of a second ceramic cavity package. The second semiconductor die may include a photoacoustic detector. The method may include electrically bonding electrical leads, associated with the photoacoustic detector, to a second set of electrical contact elements disposed in a sidewall of the second ceramic cavity package, inserting the first ceramic cavity package and the second ceramic cavity package into a housing having a plurality of lateral walls, and mounting the first ceramic cavity package and the second ceramic cavity package to opposite walls, of the plurality of lateral walls, such that the light source and the photoacoustic detector face one another, and the sidewall of the first ceramic cavity package and the sidewall of the second ceramic cavity package face away from the housing.

DETAILED DESCRIPTION

The following detailed description of example implementations refers to the accompanying drawings. The same reference numbers in different drawings may identify the same or similar elements.

Current photoacoustic gas sensor packages are large and expensive to manufacture. For example, in a present sensor package where the light source and the photoacoustic detector are arranged side-by-side, a substrate is needed to interconnect the light source and the photoacoustic detector, which increases design complexity. A large, plated reflector (for reflecting the light emitted by the light source) is also needed, which increases the size and cost of the sensor package. Furthermore, the plating of the reflector also tends to degrade over time, which shortens the lifespan of the sensor package. Other types of sensor packages, such as those where the light source and the photoacoustic detector are arranged in a stacked configuration, include a complex and expensive ceramic housing, and also require complicated interconnects between the light source and the photoacoustic detector. In addition, the absorption area or path (where a target gas absorbs the light emitted by the light source) is also limited in length, which limits sensor performance.

Some implementations, described herein, provide a photoacoustic gas sensor device (or package) that includes a light source and a photoacoustic detector mounted in individual ceramic cavity packages. Each of the ceramic cavity packages includes a sidewall having electrical contact elements disposed therethrough and exposed for coupling to a substrate, such as a printed circuit board (PCB). In some implementations, the ceramic cavity packages are disposed, and arranged, in a molded housing such that the light source and the photoacoustic detector face one another, and the electrical contact elements align with corresponding electrical contact points of a substrate when the photoacoustic gas sensor device is positioned over the substrate.

In this way, a compact photoacoustic gas sensor device, with simple ceramic cavity packages, may be provided, which reduces the complexity and cost of the photoacoustic gas sensor device. Having the electrical contact elements exposed on sidewalls of the ceramic cavity packages, as described herein, also eliminates a need for any interconnecting substrate, or electrical connections, between the light source and the photoacoustic detector, which simplifies the housing design, thereby also reducing costs. In some implementations, thermal expansion properties of the housing may also be adapted to thermal expansion properties of the substrate, which improves operational reliability, and extends the overall life, of the photoacoustic gas sensor device.

Figure 1A:
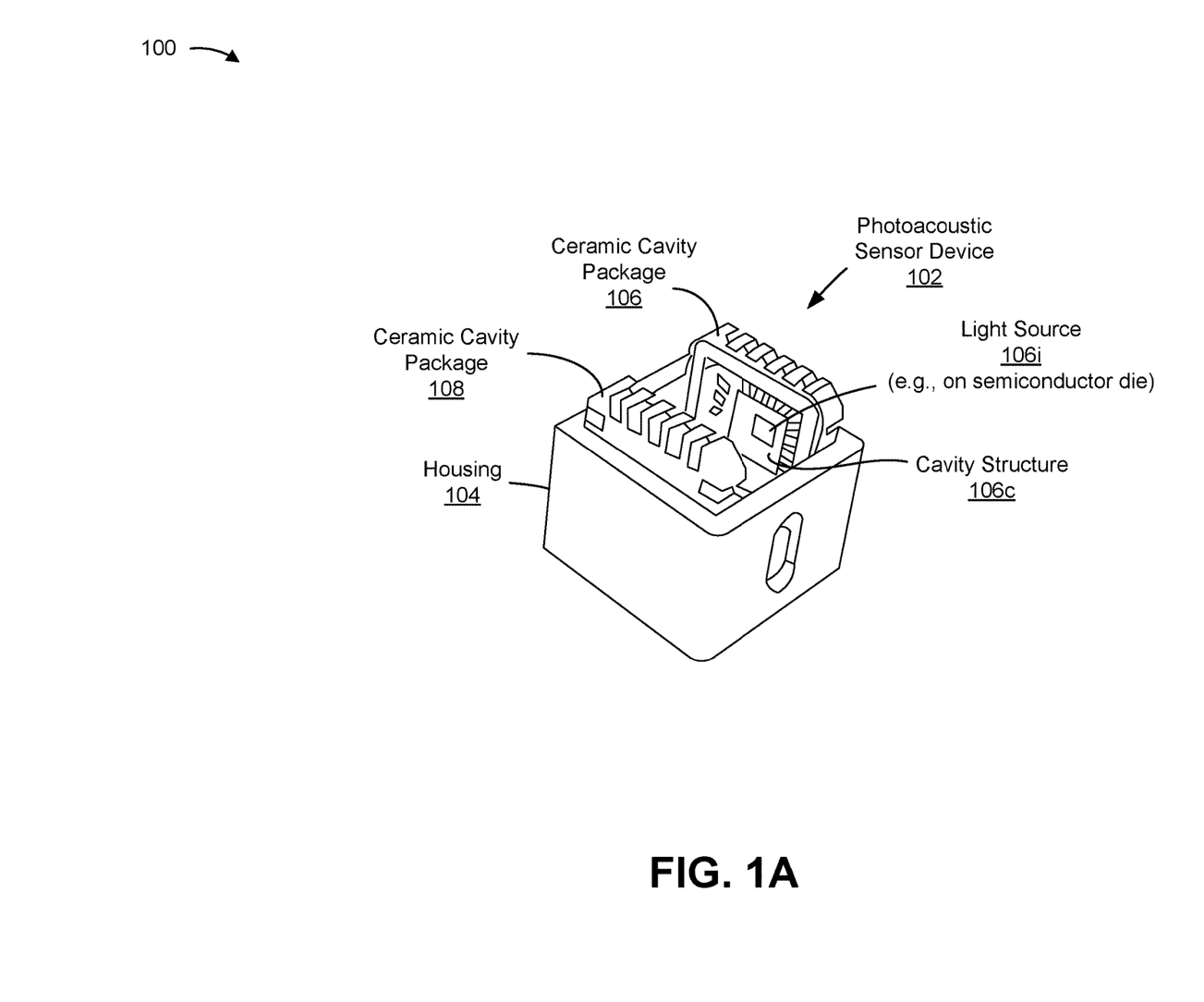
FIGS. 1A-1I are diagrams of an example implementation described herein.
Figure 1B:
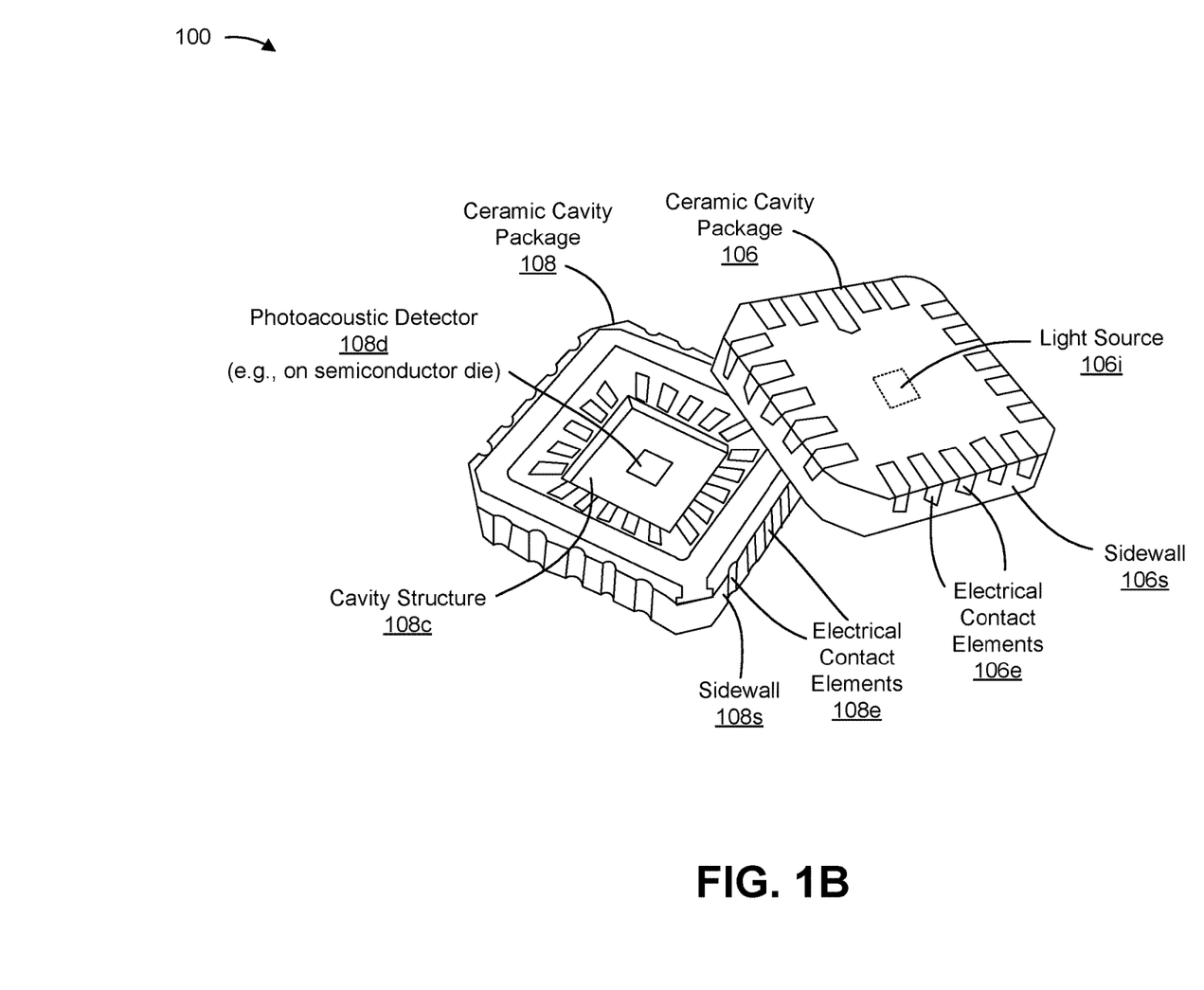
Figure 1C:
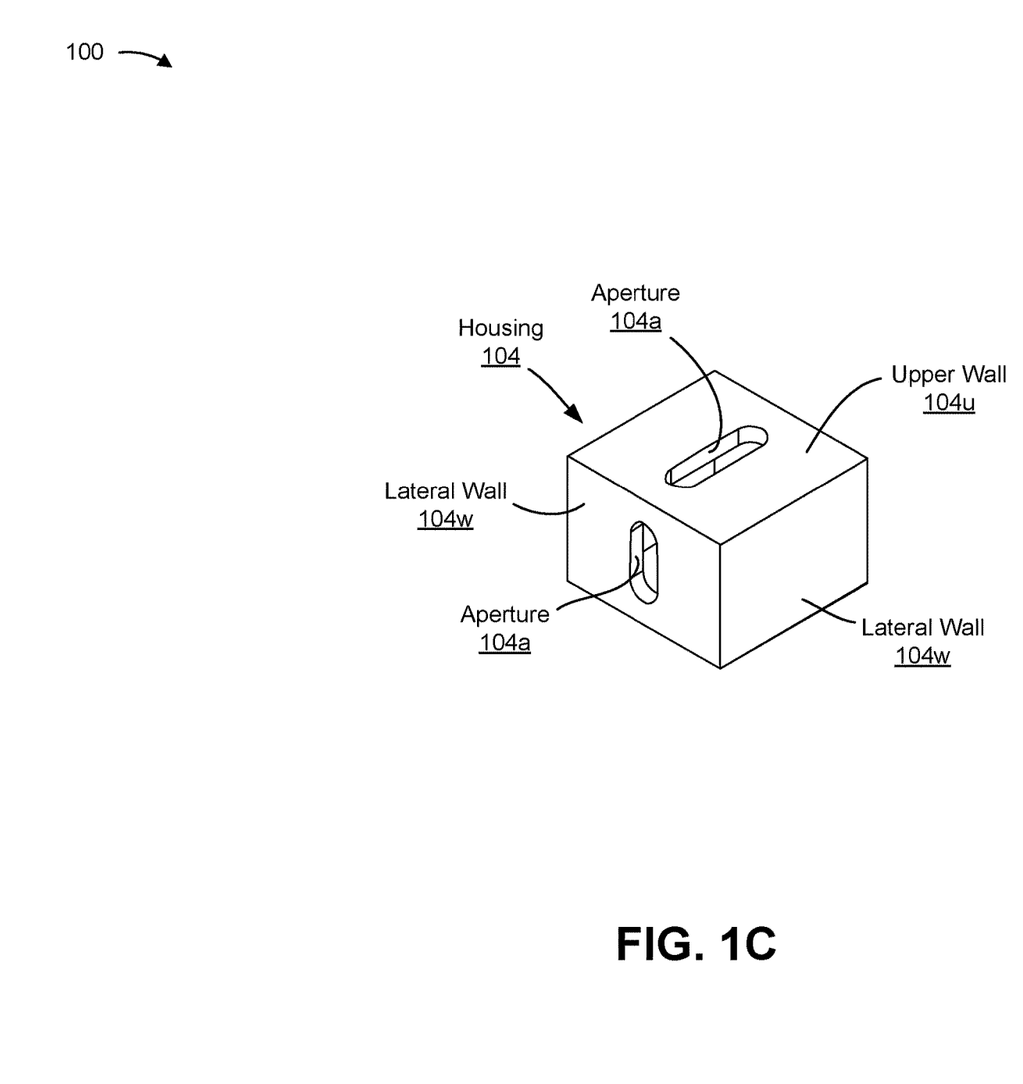
Figure 1D:
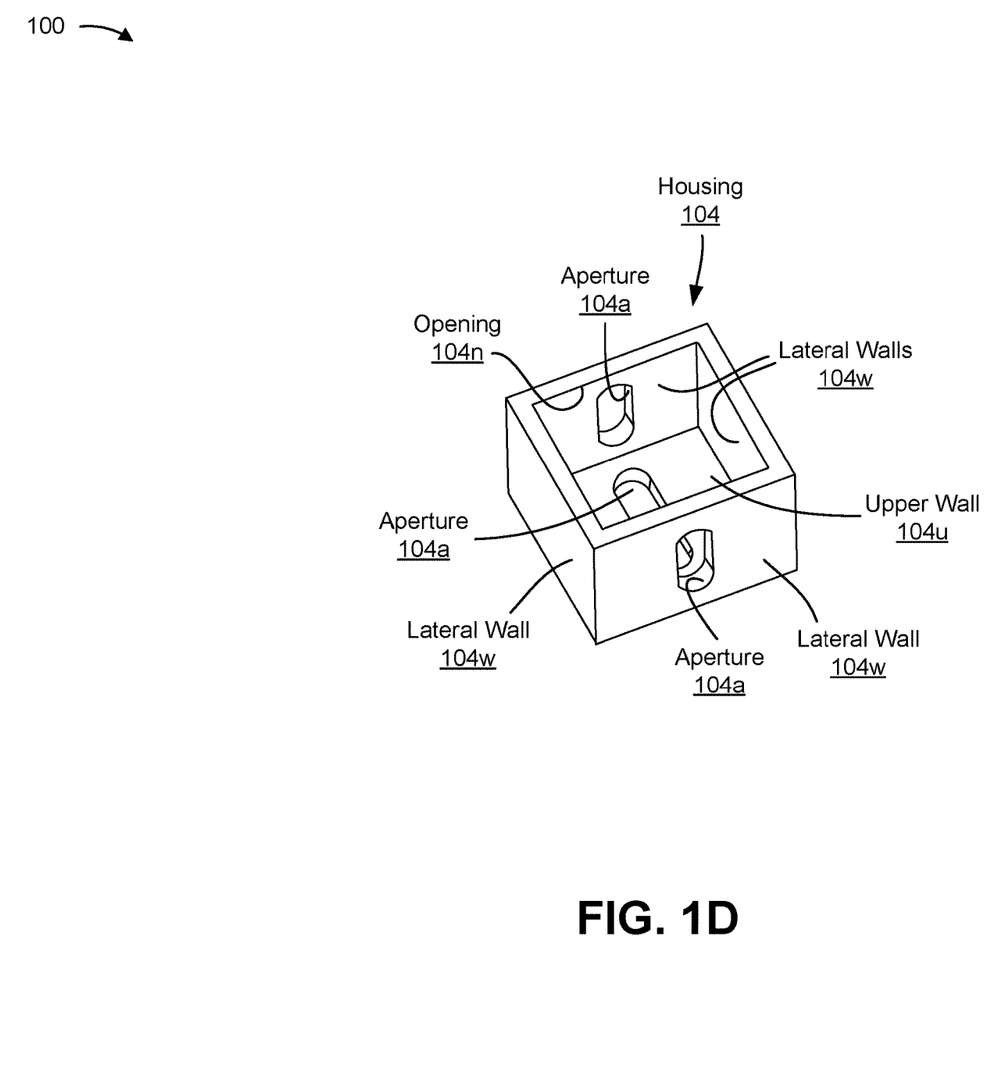

FIGS. 1A-1I are diagrams of an example implementation 100 described herein. FIG. 1A is a perspective view of example implementation 100. As shown in FIG. 1A, example implementation 100 may include a photoacoustic gas sensor device 102. In some implementations, photoacoustic gas sensor device 102 may be capable of detecting a presence, and/or a concentration, of a target gas, such as $CO_2$, carbon monoxide (CO), nitrogen ($N_2$), a gas based on an oxide of nitrogen (NOx), methane ($CH_4$), an alcohol-based gas, and/or the like, in the ambient atmosphere. As shown, photoacoustic gas sensor device 102 may include a housing 104, a ceramic cavity package 106, and a ceramic cavity package 108. FIG. 1B is a perspective view of ceramic cavity package 106 and ceramic cavity package 108, and FIGS. 1C and 1D are various perspective views of housing 104.

As shown in FIGS. 1A and 1B, ceramic cavity package 106 may include a cavity structure 106c, and a light source 106i (e.g., implemented in an integrated circuit component and/or the like, such as a semiconductor die) coupled to a surface of cavity structure 106c. For example, light source 106i may include an IR emitter configured to emit light at one or more wavelengths corresponding to an absorptive characteristic of one or more types of gases. As an example, light source 106i may include an IR emitter configured to emit light at about 4.3 micrometers (µm), which corresponds to an absorptive characteristic of $CO_2$. As further shown in FIG. 1B, ceramic cavity package 108 may include a cavity structure 108c, and a photoacoustic detector 108d (e.g., implemented in an integrated circuit component and/or the like, such as a semiconductor die) coupled to a surface of cavity structure 108c. For example, photoacoustic detector 108d may include a pressure sensitive component, such as a MEMS-based microphone. Selection of various parameters, including parameters associated with light source 106i and photoacoustic detector 108d, enables the detection of acoustic energy that is based (e.g., directly based) on a presence, and/or a concentration, of a target gas.

As further shown in FIGS. 1A and 1B, ceramic cavity package 106 may include a sidewall 106s having one or more electrical contact elements 106e disposed therethrough (e.g., as sidewall metallizations structured as castellations) that permit electrical bonding (e.g., via soldering and/or the like) between light source 106i (e.g., one or more electrical leads coupled to light source 106i) and a substrate. As shown, ceramic cavity package 108 may similarly include a sidewall 108s having one or more electrical contact elements 108e disposed therethrough that permit electrical bonding between photoacoustic detector 108d (e.g., one or more electrical leads coupled to photoacoustic detector 108d) and the substrate. Although electrical contact elements 106e and electrical contact elements 108e are shown to be configured in a single row on sidewall 106s and sidewall 108s, in some implementations, electrical contact elements 106e and/or electrical contact elements 108e may alternatively be arranged in other manners, such as over multiple rows.

Although not shown, in some implementations, sidewall 106s and/or sidewall 108s may be configured in a step-like configuration, which may facilitate post-solder-inspection (e.g., where a sufficiency of a soldering operation at the electrical contact elements may be more easily examined).

As further shown in FIGS. 1A and 1B, ceramic cavity package 106 and ceramic cavity package 108 may be disposed within housing 104. Housing 104 may be molded, printed (e.g., via three-dimensional (3D) printing), and/or the like. Housing 104 may be composed of one or more materials having thermomechanical properties that are similar to one or more materials of a substrate, such as a printed circuit board (PCB), onto which photoacoustic gas sensor device 102 may be installed. In some implementations, housing 104 may be composed of one or more non-conductive materials, such as plastic(s), ceramic(s), and/or the like. Additionally, or alternatively, housing 104 may be composed of other types of materials, such as metal or composites. As shown in FIGS. 1C and 1D, housing 104 may be a box-like structure that includes an upper wall 104u interconnecting multiple (e.g., four) lateral walls 104w. As further shown in FIG. 1D, housing 104 may include an opening 104n defined by lateral walls 104w. In some implementations, housing 104 may have a different shape and/or may have different geometry.

In some implementations, ceramic cavity package 106 and ceramic cavity package 108 may be disposed at opposite ends within housing 104 (e.g., as shown in FIG. 1A). In some implementations, ceramic cavity package 106 and ceramic cavity package 108 may be mounted to opposite lateral walls 104w. For example, ceramic cavity package 106 and ceramic cavity package 108 may each be mounted to a lateral wall 104w via one or more adhesives (e.g., glue and/or the like), one or more clip components (e.g., clip components affixed to ceramic cavity package 106 and ceramic cavity package 108 configured to complementarily couple to counterpart clip components affixed to lateral walls 104w), one or more clamp components, one or more screws or bolts, and/or the like.

As further shown in FIGS. 1C and 1D, upper wall 104u and one or more of the lateral walls 104w may be defined with one or more apertures 104a, which may permit gases—e.g., the target gas—in the ambient atmosphere, to flow into an absorption area 110 (FIGS. 1E and 1F) of housing 104. In some implementations, one or more of apertures 104a may include one or more filter materials (e.g., porous membrane(s) and/or the like) that permit gases to flow into absorption area 110, but that at least partially prevent foreign particles (e.g., dust and/or the like) from entering absorption area 110. This protects the photoacoustic gas sensor device 102 from contamination and/or corrosion, which improves the operation, and extends the life, of photoacoustic gas sensor device 102.

Figure 1E:
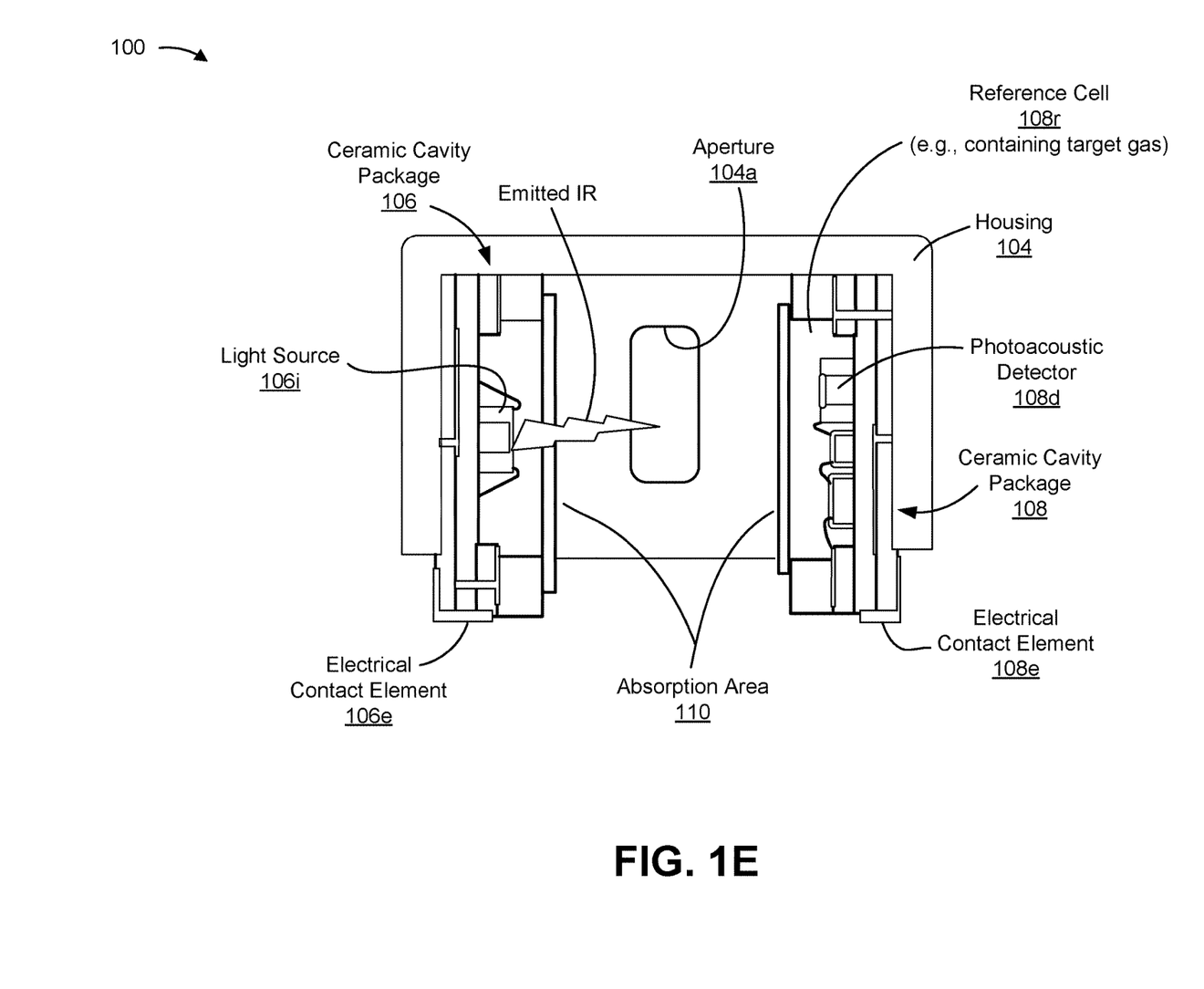
Figure 1F:
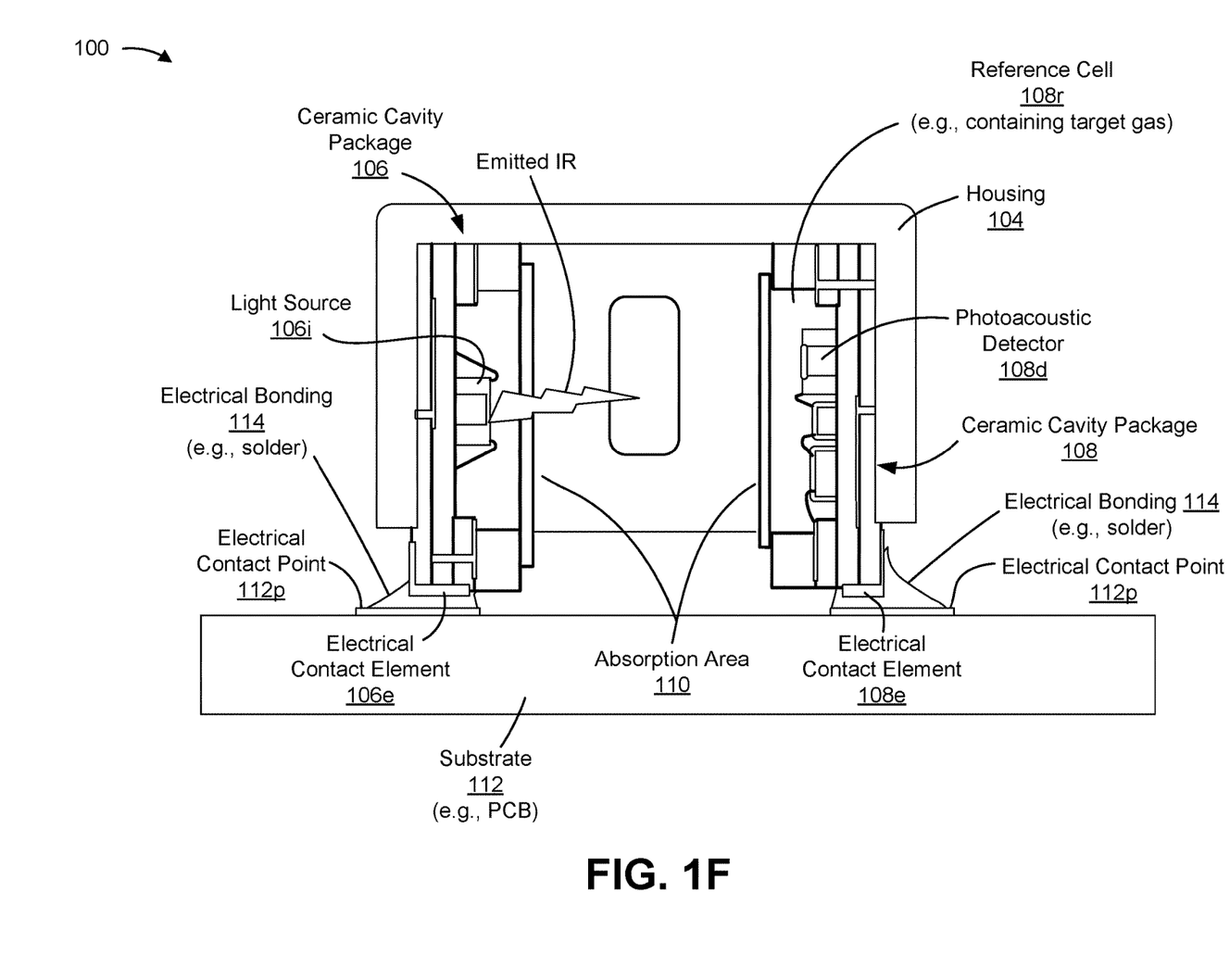
Figure 1G:
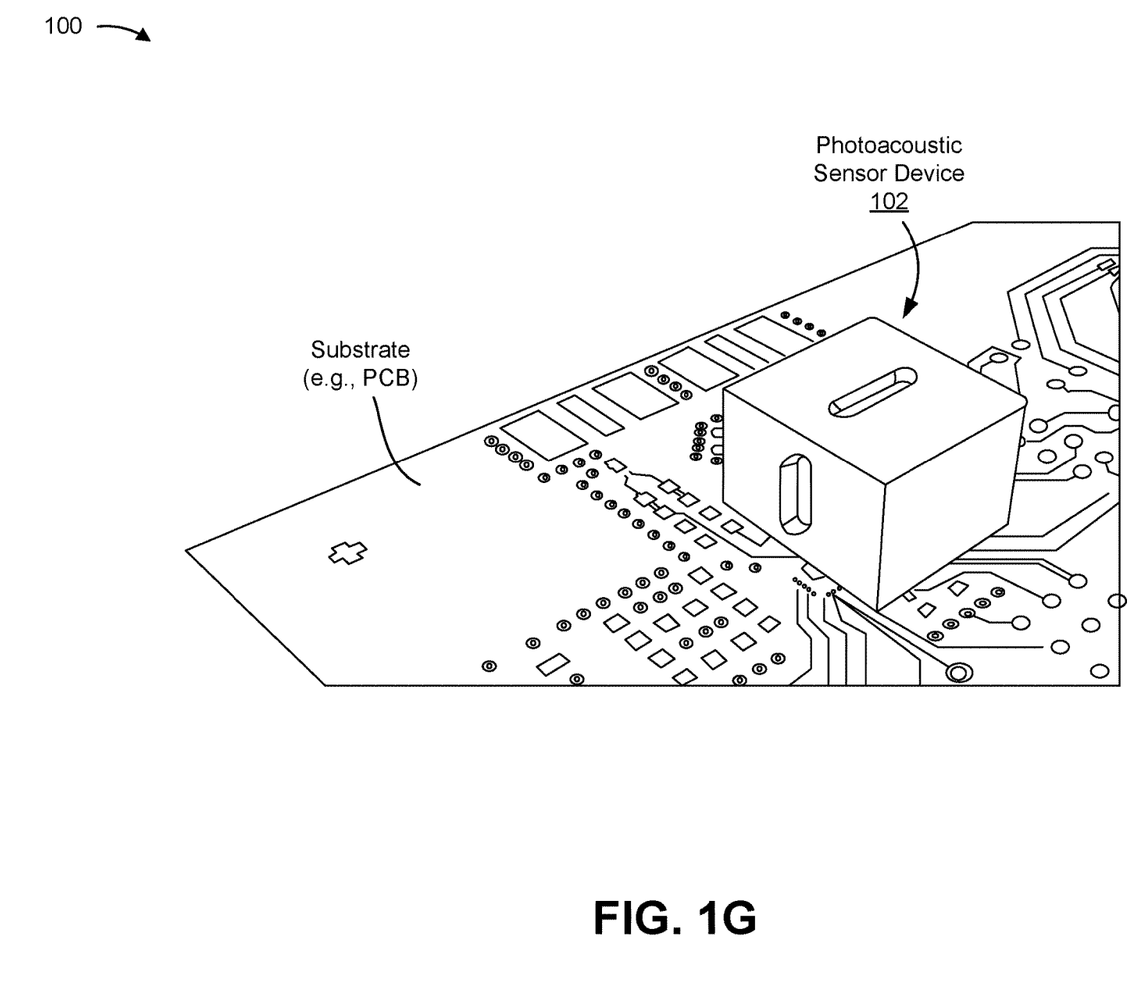

FIG. 1E is a cross-sectional view of photoacoustic gas sensor device 102. FIG. 1F is a cross-sectional view of photoacoustic gas sensor device 102 coupled to a substrate 112 (e.g., a PCB), and FIG. 1G is a perspective view of photoacoustic gas sensor device 102 and substrate 112. As shown in FIG. 1E, ceramic cavity package 106 and ceramic cavity package 108 may be arranged in housing 104 such that light source 106i and photoacoustic detector 108d face one another (e.g., are arranged in a face-to-face configuration), and such that sidewalls 106s and 108s face away from housing 104. As shown, the arrangement of ceramic cavity package 106 and ceramic cavity package 108 may, along with upper wall 104u, define absorption area 110.

In some implementations, and as shown in FIGS. 1F and 1G, photoacoustic gas sensor device 102 may be positioned over substrate 112 for coupling to substrate 112. As shown in FIG. 1F, electrical contact elements 106e (e.g., in sidewall 106s of ceramic cavity package 106) may align with, and be electrically bonded, via electrical bonding 114 (e.g., solder and/or the like), to corresponding electrical contact points 112p of substrate 112. Similarly, electrical contact elements 108e (e.g., in sidewall 108s of ceramic cavity package 108) may align with, and be electrically bonded, via another electrical bonding 114, to corresponding electrical contact points 112p of substrate 112.

In some implementations, and as further shown in FIGS. 1E and 1F (as well as in FIG. 1A), the dimensions of ceramic cavity package 106, ceramic cavity package 108, and/or housing 104 may be defined such that ceramic cavity package 106 and ceramic cavity package 108 extend beyond opening 104n of housing 104. This permits gases, in the ambient atmosphere, to further enter into absorption area 110 (e.g., in addition to gas entry into absorption area 110 via apertures 104a, as described above) when photoacoustic gas sensor device 102 is mounted onto a substrate. Alternatively, the dimensions of ceramic cavity package 106, ceramic cavity package 108, and/or housing 104 may be defined such that ceramic cavity package 106 and ceramic cavity package 108 do not extend beyond opening 104n. In this case, gases, in the ambient atmosphere, may enter into absorption area 110 mainly via apertures 104a.

As further shown in FIGS. 1E and 1F, ceramic cavity package 108 may include a volume of a target gas (e.g., the same target gas to be detected in absorption area 210) sealed in a reference cell 108r with photoacoustic detector 108d. In some implementations, the volume of the target gas may be hermetically sealed in reference cell 108r. In some implementations, various other components may be included in reference cell 108r, including, for example, integrated circuits (e.g., application-specific integrated circuits (ASICs) and/or the like), passive circuitry components, and/or the like. In operation, for example, a target gas, in absorption area 110, may absorb light (e.g., modulated IR energy, such as at a low frequency (e.g., at 10 hertz (Hz), 20 Hz, and/or the like)) emitted from light source 106i, may thermally expand based on the absorbed light, and may emit corresponding acoustic energy. The volume of the target gas, in reference cell 108r, may amplify the corresponding acoustic energy for detection by photoacoustic detector 108d and generation of a corresponding measurement. Amplification of the acoustic energy may compensate for, and/or cancel, ambient noise effects and/or pressure variation, which improves the signal-to-noise ratio and the overall accuracy of the measurement.

In some implementations, ceramic cavity package 106 may include one or more optical lids (e.g., composed of sapphire and/or the like) configured to cover light source 106i and permit light emitted from light source 106i to pass into absorption area 110 and into reference cell 108r.

Figure 1H:
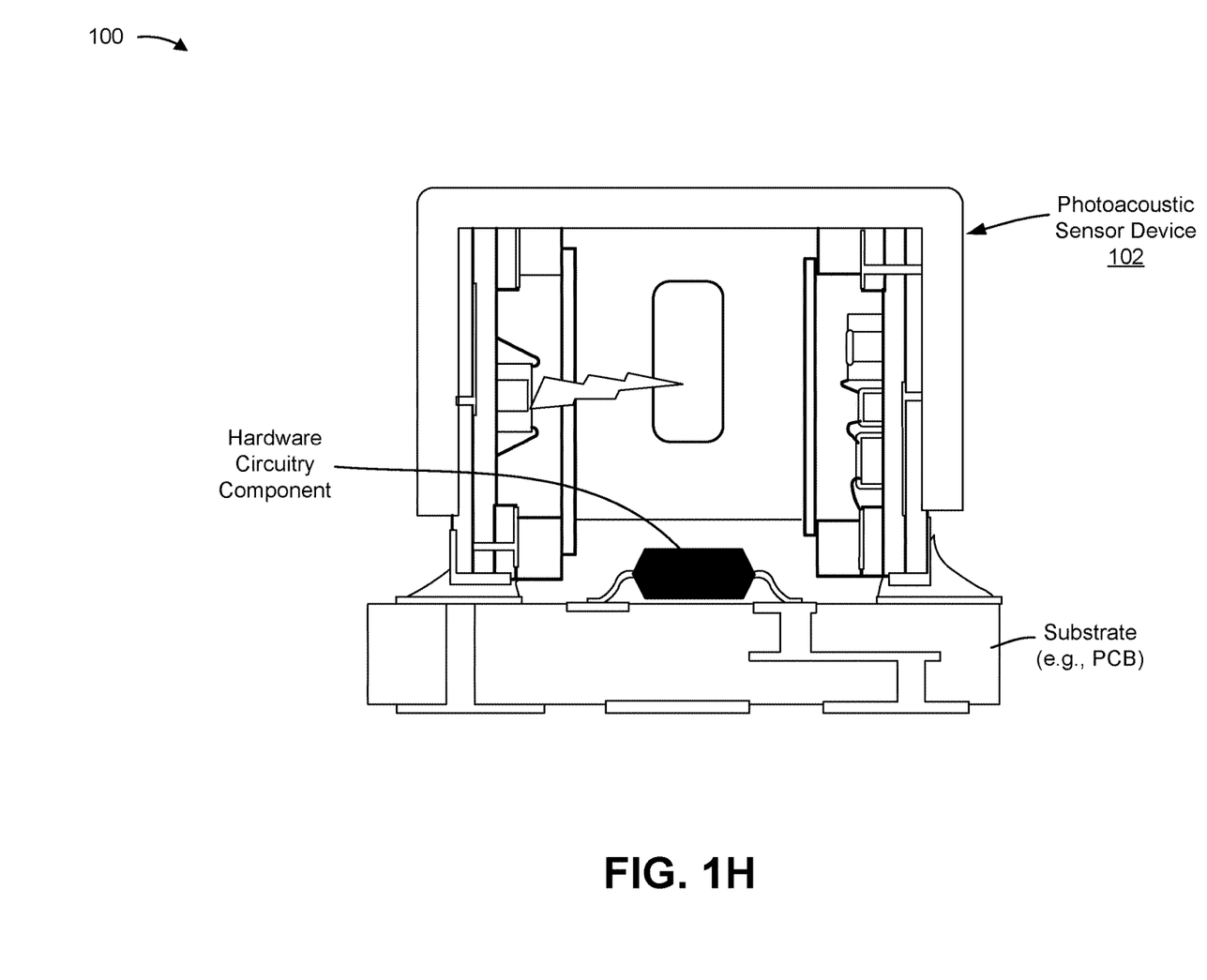
Figure 1I:
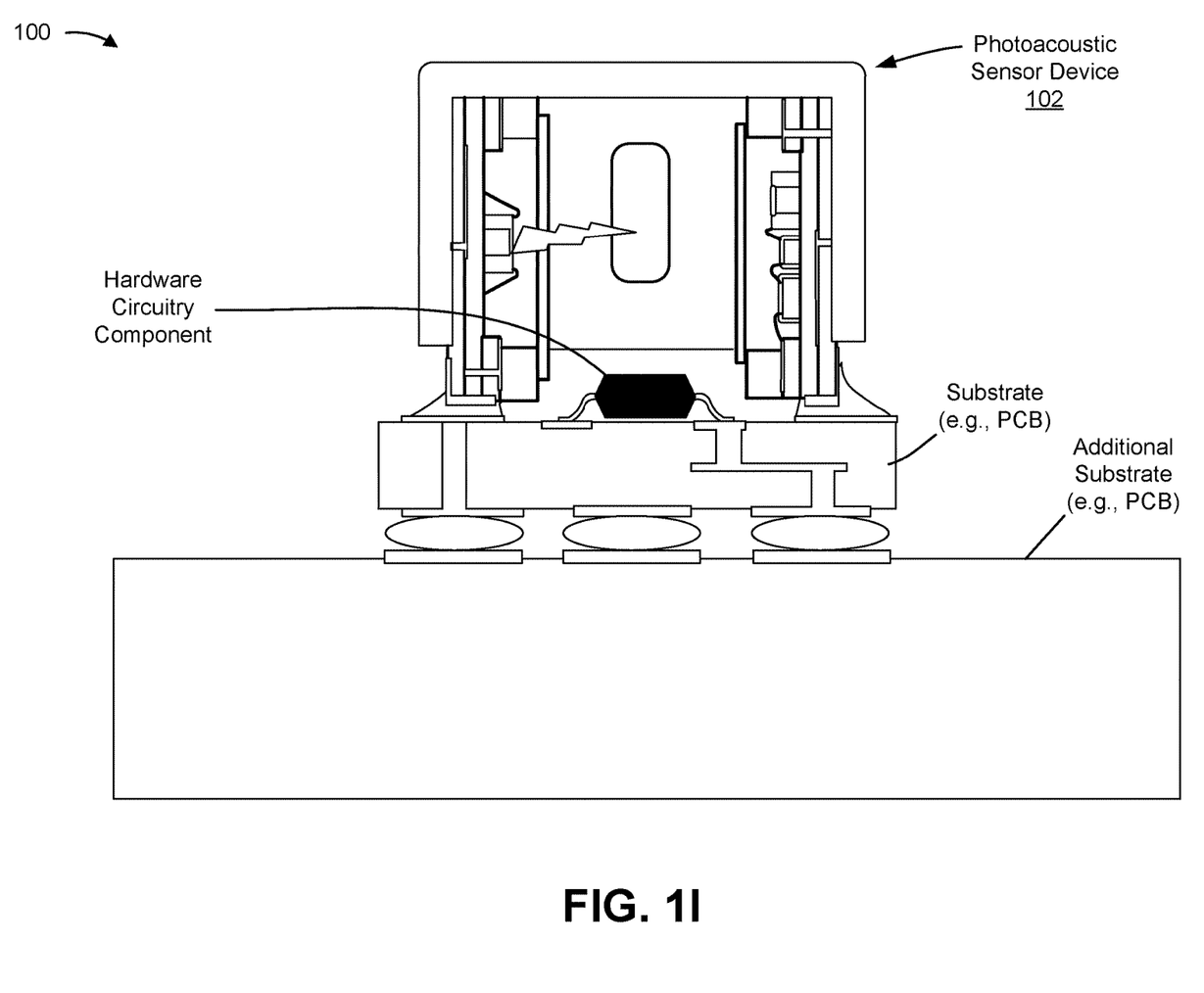

In some implementations, photoacoustic gas sensor device 102 may be configured to accommodate one or more other hardware circuitry components, such as processor components (e.g., one or more microcontrollers), integrated circuits (e.g., ASICs and/or the like), driver(s) (e.g., for providing electrical pulses to light source 106i), passive circuitry components, sensor devices (e.g., pressure sensors, humidity sensors, light sensors, and/or the like), and/or the like, for facilitating operations of photoacoustic gas sensor device 102. FIG. 1H is a cross-sectional view of photoacoustic gas sensor device 102 coupled to a substrate (e.g., a PCB and/or the like) onto which one or more hardware circuitry components may be installed. As shown, the hardware circuitry component(s) may be positioned between ceramic cavity package 106 and ceramic cavity package 108 when photoacoustic gas sensor device 102 is mounted onto the substrate. As shown in FIG. 1I, the substrate may be mounted onto an additional substrate, such as another PCB and/or the like. This provides for flexible arrangements of circuitry components, which frees up space on a PCB and/or enables more compact sensor system constructions.

In this way, a compact photoacoustic gas sensor device, with simple ceramic cavity packages, may be provided, which reduces the complexity and cost of the photoacoustic gas sensor device. Having the electrical contact elements exposed on sidewalls of the ceramic cavity packages, as described herein, also eliminates a need for any interconnecting substrate, or electrical connections, between the light source and the photoacoustic detector, which simplifies the housing design, thereby also reducing costs. In some implementations, thermal expansion properties of the housing may also be adapted to thermal expansion properties of the substrate, which improves operational reliability, and extends the overall life, of the photoacoustic gas sensor device.

As indicated above, FIGS. 1A-1I are provided merely as examples. Other examples are possible and may differ from what was described with regard to FIGS. 1A-1I.

Figure 2:
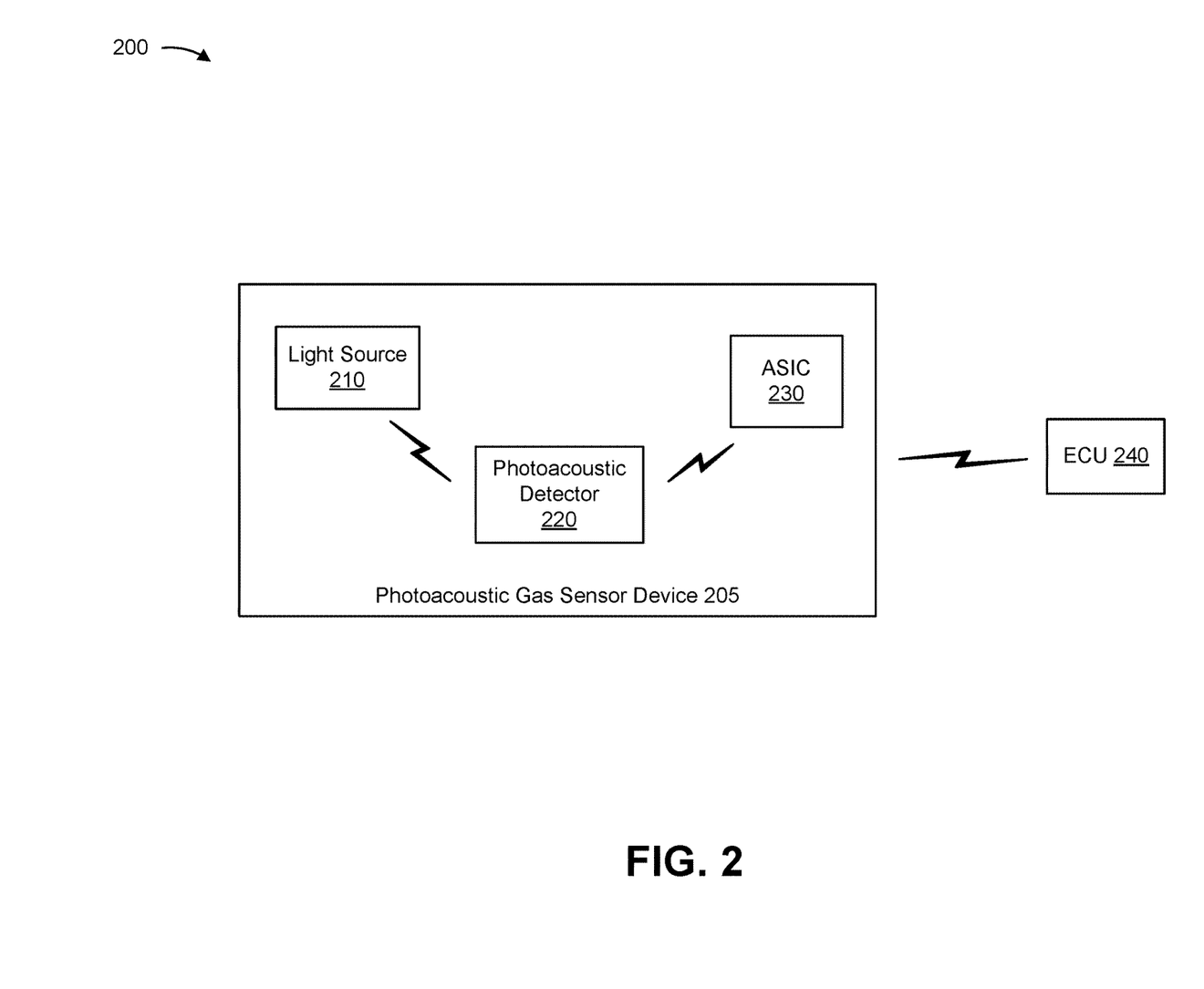
FIG. 2 is a diagram of an example environment in which systems and/or methods, described herein, may be implemented.

FIG. 2 is a diagram of an example environment 200 in which techniques, devices, systems, and/or methods described herein may be implemented. As shown in FIG. 2, environment 200 may include a photoacoustic gas sensor device 205 and an electronic control unit (ECU) 240.

Photoacoustic gas sensor device 205 includes a housing in which one or more components, for measuring one or more physical properties or parameters of a substance (e.g., a target gas), may be disposed. In some implementations, photoacoustic gas sensor device 205 may correspond to one or more photoacoustic gas sensor device implementations described elsewhere herein. For example, photoacoustic gas sensor device 205 may correspond to photoacoustic gas sensor device 102, described above in connection with FIGS. 1A-1I. As shown, photoacoustic gas sensor device 205 may include a light source 210, a photoacoustic detector 220, and circuitry—e.g., an ASIC 230. In some implementations, photoacoustic gas sensor device 205 is remote from ECU 240 and connected to ECU 240 via a bus (e.g., via a wired connection).

Light source 210 includes one or more devices capable of emitting light for purposes of measuring one or more physical properties or parameters of a substance, such as detecting a presence and/or concentration of a target gas. In some implementations, light source 210 may be implemented in an integrated circuit component and/or the like, such as on a semiconductor die. In some implementations, light source 210 may include an IR emitter, such as may be configured to emit light at a wavelength corresponding to an absorptive characteristic of a target gas. In some implementations, light source 210 may correspond to light source 106i, described above in connection with FIGS. 1A-1I.

Photoacoustic detector 220 includes one or more devices capable of detecting acoustic energy for purposes of measuring one or more physical properties or parameters of a substance, such as detecting a presence and/or concentration of a target gas. In some implementations, photoacoustic detector 220 may be implemented in an integrated circuit component and/or the like, such as on a semiconductor die. For example, photoacoustic detector 220 may include a pressure sensitive component, such as a MEMS-based microphone. In some implementations, photoacoustic detector 220 may correspond to photoacoustic detector 108*d*, described above in connection with FIGS. 1A-1I.

ASIC 230 includes an analog-to-digital convertor, a digital signal processor, a memory component, a digital interface, and/or the like that facilitate the sensing function. In some implementations, ASIC 230 may include a transceiver configured to transmit and receive information (e.g., between photoacoustic gas sensor device 205, ECU 240, and/or the like). For example, the transceiver may include a differential line transceiver or a similar type device. In some implementations, the transceiver may include a transmit component that allows photoacoustic gas sensor device 205 to transmit information (e.g., data samples and/or the like) to ECU 240 via a bus, and a receive component that allows photoacoustic gas sensor device 205 to receive information from ECU 240 via the bus. In some implementations, the transceiver may include a line driver for enabling the transmit component to transmit information, or the receive component to receive information, at a given time.

ECU 240 includes one or more devices associated with controlling one or more electrical systems and/or electrical subsystems based on sensor data provided by photoacoustic gas sensor device 205. In some implementations, ECU 240 may include a transceiver and a microcontroller (μC). In some implementations, the μC may be capable of calibrating, controlling, adjusting, and/or the like the one or more electrical systems and/or electrical subsystems based on sensor data transmitted by photoacoustic gas sensor device 205. For example, in some implementations, the μC may include an electronic/engine control module (ECM), a powertrain control module (PCM), a transmission control module (TCM), a brake control module (BCM or EBCM), a central control module (CCM), a central timing module (CTM), a general electronic module (GEM), a body control module (BCM), a suspension control module (SCM), or another electrical system or electrical subsystem of a vehicle.

The number and arrangement of apparatuses shown in FIG. 2 is provided as an example. In practice, there may be additional devices and/or components, fewer devices and/or components, different devices and/or components, or differently arranged devices and/or components than those shown in FIG. 2.

Figure 3:
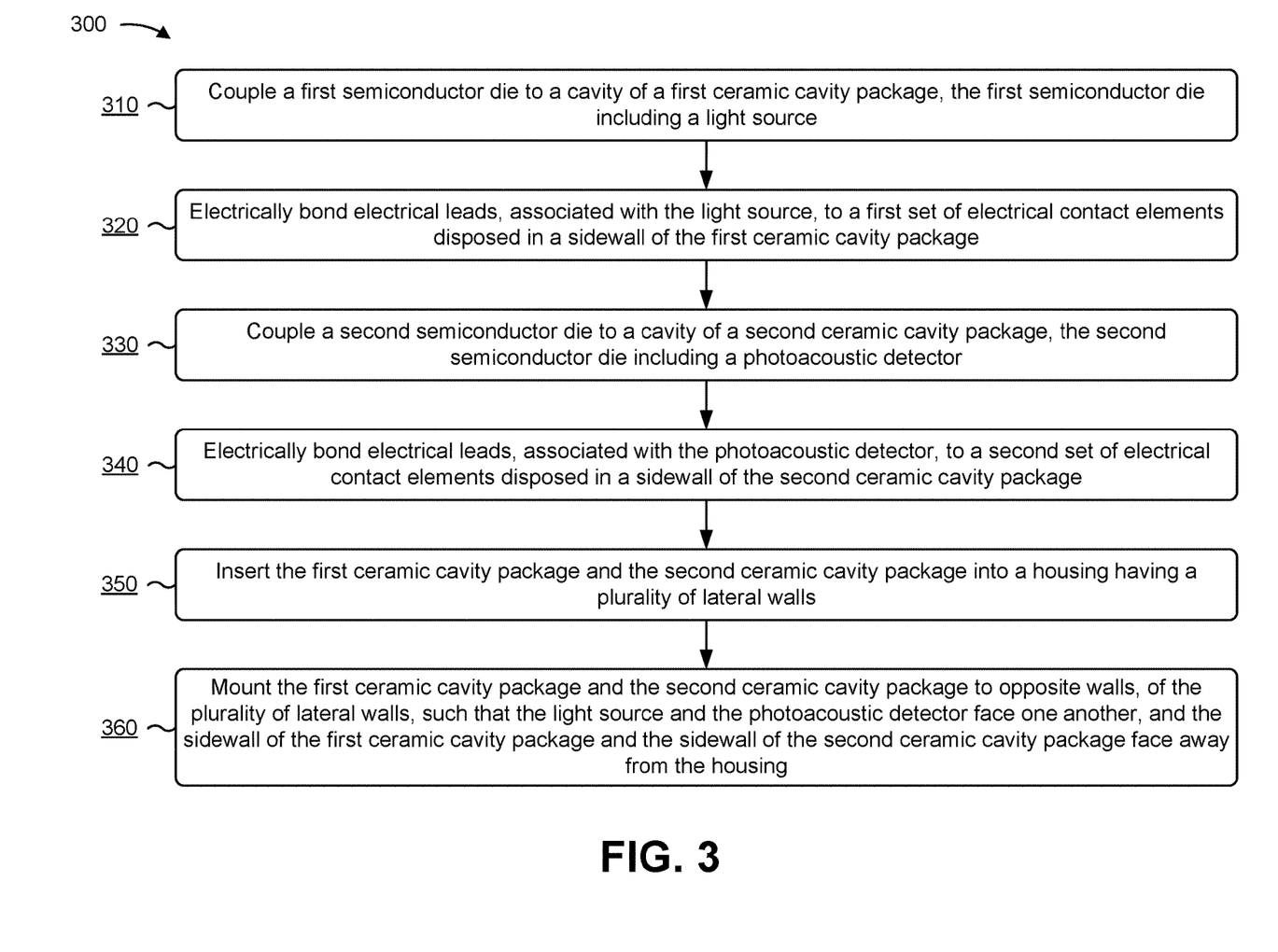
FIG. 3 is a flow chart of an example process for manufacturing a photoacoustic gas sensor device.

FIG. 3 is a flow chart of an example process 300 for manufacturing a photoacoustic gas sensor device. As shown in FIG. 3, process 300 may include coupling a first semiconductor die to a cavity of a first ceramic cavity package, the first semiconductor die including a light source (block 310). For example, process 300 may include coupling a first semiconductor die to a cavity of a first ceramic cavity package, as described above in connection with FIGS. 1A-1I. In some implementations, the first semiconductor die may include a light source.

As further shown in FIG. 3, process 300 may include electrically bonding electrical leads, associated with the light source, to a first set of electrical contact elements disposed in a sidewall of the first ceramic cavity package (block 320). For example, process 300 may include electrically bonding electrical leads, associated with the light source, to a first set of electrical contact elements disposed in a sidewall of the first ceramic cavity package, as described above in connection with FIGS. 1A-1I.

As further shown in FIG. 3, process 300 may include coupling a second semiconductor die to a cavity of a second ceramic cavity package, the second semiconductor die including a photoacoustic detector (block 330). For example, process 300 may include coupling a second semiconductor die to a cavity of a second ceramic cavity package, as described above in connection with FIGS. 1A-1I. In some implementations, the second semiconductor die may include a photoacoustic detector.

As further shown in FIG. 3, process 300 may include electrically bonding electrical leads, associated with the photoacoustic detector, to a second set of electrical contact elements disposed in a sidewall of the second ceramic cavity package (block 340). For example, process 300 may include electrically bonding electrical leads, associated with the photoacoustic detector, to a second set of electrical contact elements disposed in a sidewall of the second ceramic cavity package, as described above in connection with FIGS. 1A-1I.

As further shown in FIG. 3, process 300 may include inserting the first ceramic cavity package and the second ceramic cavity package into a housing having a plurality of lateral walls (block 350). For example, process 300 may include inserting the first ceramic cavity package and the second ceramic cavity package into a housing having a plurality of lateral walls, as described above in connection with FIGS. 1A-1I.

As further shown in FIG. 3, process 300 may include mounting the first ceramic cavity package and the second ceramic cavity package to opposite walls, of the plurality of lateral walls, such that the light source and the photoacoustic detector face one another, and the sidewall of the first ceramic cavity package and the sidewall of the second ceramic cavity package face away from the housing (block 360). For example, process 300 may include mounting the first ceramic cavity package and the second ceramic cavity package to opposite walls, of the plurality of lateral walls, such that the light source and the photoacoustic detector face one another, and the sidewall of the first ceramic cavity package and the sidewall of the second ceramic cavity package face away from the housing, as described above in connection with FIGS. 1A-1I.

Process 300 may include additional implementations, such as any single implementation or any combination of implementations described below and/or in connection with one or more other processes described elsewhere herein.

In some implementations, process 300 may include positioning the housing over a printed circuit board (PCB) that includes a plurality of electrical contact points. In some implementations, process 300 may include electrically bonding the first set of electrical contact elements and the second set of electrical contact elements to corresponding electrical contact points of the plurality of electrical contact points.

In some implementations, process 300 may include coupling a hardware circuitry component to a substrate, the substrate including a plurality of electrical contact points. In some implementations, process 300 may include positioning the housing over the hardware circuitry component and the substrate such that the housing at least partially covers the hardware circuitry component, and electrically bonding the first set of electrical contact elements and the second set of electrical contact elements to corresponding electrical contact points of the plurality of electrical contact points. In some implementations, the hardware circuitry component may include a processor device, a pressure sensor device, a humidity sensor device, a light sensor device, an integrated circuit (IC), or a driver for the light source.

In some implementations, a photoacoustic sensor device may include a housing and a first ceramic cavity package disposed in the housing. In some implementations, the first ceramic cavity package may include a first sidewall having a first set of electrical contact elements, a first cavity structure, and a light source mounted to the first cavity structure, and electrically coupled to the first set of electrical contact elements. In some implementations, the photoacoustic sensor device may include a second ceramic cavity package disposed in the housing. In some implementations, the second ceramic cavity package may include a second sidewall having a second set of electrical contact elements, a second cavity structure, and a photoacoustic detector mounted to the second cavity structure, and electrically coupled to the second set of electrical contact elements. In some implementations, the first ceramic cavity package and the second ceramic cavity package may be arranged such that the light source and the photoacoustic detector face one another, and may be oriented such that the first set of electrical contact elements and the second set of electrical contact elements align with corresponding electrical contact points of a printed circuit board (PCB) when the photoacoustic sensor device is positioned over the PCB for coupling to the PCB.

In some implementations, the photoacoustic sensor device may not include an interconnecting substrate, or any electrical connections, between the first ceramic cavity package and the second ceramic cavity package. In some implementations, the housing may include an upper wall that interconnects a plurality of lateral walls. In some implementations, the first ceramic cavity package may be positioned against a first lateral wall of the plurality of lateral walls. In some implementations, the second ceramic cavity package may be positioned against a second lateral wall, of the plurality of lateral walls, that is opposite the first lateral wall. In some implementations, the upper wall, the first ceramic cavity package, and the second ceramic cavity package may define an absorption area into which a target gas, in an ambient atmosphere, is permitted to flow.

In some implementations, the housing may include a first aperture defined in the upper wall, and a second aperture defined in a lateral wall of the plurality of lateral walls. In some implementations, the first aperture and the second aperture may permit a target gas, in an ambient atmosphere, to flow into the housing. In some implementations, the housing may include an opening defined by the plurality of lateral walls. In some implementations, both the first ceramic cavity package and the second ceramic cavity package may at least partially extend beyond the opening such that the first sidewall and the second sidewall are positioned externally from the housing.

In some implementations, the light source may include an infrared (IR) emitter. In some implementations, the photoacoustic detector may include a microelectromechanical system (MEMS)-based microphone. In some implementations, the light source may be mounted to the first cavity structure via a first adhesive, a first clip component, and/or a first clamp component. In some implementations, the photoacoustic detector may be mounted to the second cavity structure via a second adhesive, a second clip component, and/or a second clamp component. In some implementations, the photoacoustic sensor device may be configured to detect a presence of a target gas, or a concentration of the target gas, using the light source and the photoacoustic detector.

In some implementations, a photoacoustic gas sensor device may include a housing and a first ceramic cavity package disposed in the housing. In some implementations, the first ceramic cavity package may include a first sidewall having a first set of electrical contact elements, a first cavity structure, and a first semiconductor die coupled to the first cavity structure. In some implementations, the first semiconductor die may include an infrared (IR) emitter. In some implementations, the IR emitter may be electrically coupled to the first set of electrical contact elements. In some implementations, the photoacoustic gas sensor device may include a second ceramic cavity package disposed in the housing. In some implementations, the second ceramic cavity package may include a second sidewall having a second set of electrical contact elements, a second cavity structure, and a second semiconductor die coupled to the second cavity structure. In some implementations, the second semiconductor die may include a photoacoustic detector. In some implementations, the photoacoustic detector may be electrically coupled to the second set of electrical contact elements. In some implementations, the first ceramic cavity package and the second ceramic cavity package may be arranged such that the IR emitter and the photoacoustic detector face one another, and oriented such that the first set of electrical contact elements and the second set of electrical contact elements align with corresponding electrical contact points of a substrate when the photoacoustic gas sensor device is positioned over the substrate for coupling to the substrate.

In some implementations, the first ceramic cavity package and the second ceramic cavity package may be disposed at opposite ends of the housing. In some implementations, each of the first ceramic cavity package and the second ceramic cavity package may be coupled to the housing via an adhesive, a clip component, and/or a clamp component. In some implementations, the second ceramic cavity package may further include a volume of target gas enclosed in the second cavity structure with the photoacoustic detector. In some implementations, the volume of target gas may be hermetically sealed in the second cavity structure. In some implementations, the target gas may include carbon dioxide ($CO_2$), carbon monoxide (CO), nitrogen ($N_2$), a gas based on an oxide of nitrogen ($NO_x$), methane ($CH_4$), or an alcohol-based gas.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

In this way, a compact photoacoustic gas sensor device, with simple ceramic cavity packages, may be provided, which reduces the complexity and cost of the photoacoustic gas sensor device. Having the electrical contact elements exposed on sidewalls of the ceramic cavity packages, as described herein, also eliminates a need for any interconnecting substrate, or electrical connections, between the light source and the photoacoustic detector, which simplifies the housing design, thereby also reducing costs. In some implementations, thermal expansion properties of the housing may also be adapted to thermal expansion properties of the substrate, which improves operational reliability, and extends the overall life, of the photoacoustic gas sensor device.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A photoacoustic sensor device, comprising:
    a housing;
    a first ceramic cavity package disposed in the housing,
        the first ceramic cavity package including:
            a first sidewall having a first set of electrical contact elements,
            a first cavity structure, and
            a light source mounted to the first cavity structure, and electrically coupled to the first set of electrical contact elements; and
    a second ceramic cavity package disposed in the housing,
        the second ceramic cavity package including:
            a second sidewall having a second set of electrical contact elements,
            a second cavity structure, and
            a photoacoustic detector mounted to the second cavity structure, and
            electrically coupled to the second set of electrical contact elements,
        the first ceramic cavity package and the second ceramic cavity package being arranged such that the light source and the photoacoustic detector face one another, and being oriented such that the first set of electrical contact elements and the second set of electrical contact elements align with corresponding electrical contact points of a printed circuit board (PCB) when the photoacoustic sensor device is positioned over the PCB for coupling to the PCB.

2. The photoacoustic sensor device of claim 1, wherein the photoacoustic sensor device does not include an interconnecting substrate, or any electrical connections, between the first ceramic cavity package and the second ceramic cavity package.

3. The photoacoustic sensor device of claim 1, wherein the housing includes an upper wall that interconnects a plurality of lateral walls.

4. The photoacoustic sensor device of claim 3, wherein the first ceramic cavity package is positioned against a first lateral wall of the plurality of lateral walls;
    wherein the second ceramic cavity package is positioned against a second lateral wall, of the plurality of lateral walls, that is opposite the first lateral wall; and
    wherein the upper wall, the first ceramic cavity package, and the second ceramic cavity package define an absorption area into which a target gas, in an ambient atmosphere, is permitted to flow.

5. The photoacoustic sensor device of claim 3, wherein the housing includes a first aperture defined in the upper wall, and a second aperture defined in a lateral wall of the plurality of lateral walls; and
    wherein the first aperture and the second aperture permit a target gas, in an ambient atmosphere, to flow into the housing.

6. The photoacoustic sensor device of claim 3, wherein the housing includes an opening defined by the plurality of lateral walls; and
    wherein both the first ceramic cavity package and the second ceramic cavity package at least partially extend beyond the opening such that the first sidewall and the second sidewall are positioned externally from the housing.

7. The photoacoustic sensor device of claim 1, wherein the light source includes an infrared (IR) emitter.

8. The photoacoustic sensor device of claim 1, wherein the photoacoustic detector includes a microelectromechanical system (MEMS)-based microphone.

9. The photoacoustic sensor device of claim 1, wherein the light source is mounted to the first cavity structure via a first adhesive, a first clip component, and/or a first clamp component; and
    wherein the photoacoustic detector is mounted to the second cavity structure via a second adhesive, a second clip component, and/or a second clamp component.

10. The photoacoustic sensor device of claim 1, wherein the photoacoustic sensor device is configured to detect a presence of a target gas, or a concentration of the target gas, using the light source and the photoacoustic detector.

11. A photoacoustic gas sensor device, comprising:
    a housing;
    a first ceramic cavity package disposed in the housing,
        the first ceramic cavity package including:
            a first sidewall having a first set of electrical contact elements,
            a first cavity structure, and
            a first semiconductor die coupled to the first cavity structure,
                the first semiconductor die including an infrared (IR) emitter,
                the IR emitter being electrically coupled to the first set of electrical contact elements; and
    a second ceramic cavity package disposed in the housing,
        the second ceramic cavity package including:
            a second sidewall having a second set of electrical contact elements,
            a second cavity structure, and a second semiconductor die coupled to the second cavity structure,
the second semiconductor die including a photoacoustic detector,
the photoacoustic detector being electrically coupled to the second set of electrical contact elements,
the first ceramic cavity package and the second ceramic cavity package being arranged such that the IR emitter and the photoacoustic detector face one another, and oriented such that the first set of electrical contact elements and the second set of electrical contact elements align with corresponding electrical contact points of a substrate when the photoacoustic gas sensor device is positioned over the substrate for coupling to the substrate.

12. The photoacoustic gas sensor device of claim 11, wherein the first ceramic cavity package and the second ceramic cavity package are disposed at opposite ends of the housing.

13. The photoacoustic gas sensor device of claim 11, wherein each of the first ceramic cavity package and the second ceramic cavity package is coupled to the housing via an adhesive, a clip component, and/or a clamp component.

14. The photoacoustic gas sensor device of claim 11, wherein the second ceramic cavity package further includes a volume of target gas enclosed in the second cavity structure with the photoacoustic detector.

15. The photoacoustic gas sensor device of claim 14, wherein the volume of target gas is hermetically sealed in the second cavity structure.

16. The photoacoustic gas sensor device of claim 14, wherein the target gas includes:
carbon dioxide ($CO_2$),
carbon monoxide (CO),
nitrogen ($N_2$)
a gas based on an oxide of nitrogen ($NO_x$),
methane ($CH_4$), or
an alcohol-based gas.

17. A method, comprising:
coupling a first semiconductor die to a cavity of a first ceramic cavity package,
the first semiconductor die including a light source;
electrically bonding electrical leads, associated with the light source, to a first set of electrical contact elements disposed in a sidewall of the first ceramic cavity package;
coupling a second semiconductor die to a cavity of a second ceramic cavity package,
the second semiconductor die including a photoacoustic detector;
electrically bonding electrical leads, associated with the photoacoustic detector, to a second set of electrical contact elements disposed in a sidewall of the second ceramic cavity package;
inserting the first ceramic cavity package and the second ceramic cavity package into a housing having a plurality of lateral walls; and
mounting the first ceramic cavity package and the second ceramic cavity package to opposite walls, of the plurality of lateral walls, such that the light source and the photoacoustic detector face one another, and the sidewall of the first ceramic cavity package and the sidewall of the second ceramic cavity package face away from the housing.

18. The method of claim 17, further comprising:
positioning the housing over a printed circuit board (PCB),
the PCB including a plurality of electrical contact points; and
electrically bonding the first set of electrical contact elements and the second set of electrical contact elements to corresponding electrical contact points of the plurality of electrical contact points.

19. The method of claim 17, further comprising:
coupling a hardware circuitry component to a substrate,
the substrate including a plurality of electrical contact points;
positioning the housing over the hardware circuitry component and the substrate such that the housing at least partially covers the hardware circuitry component; and
electrically bonding the first set of electrical contact elements and the second set of electrical contact elements to corresponding electrical contact points of the plurality of electrical contact points.

20. The method of claim 19, wherein the hardware circuitry component includes:
a processor device,
a pressure sensor device,
a humidity sensor device,
a light sensor device,
an integrated circuit (IC), or
a driver for the light source.

* * * * *